(12) United States Patent
Chang et al.

(10) Patent No.: US 9,151,994 B2
(45) Date of Patent: Oct. 6, 2015

(54) DISPLAY PANEL

(75) Inventors: Wen-Zong Chang, Kaohsiung (TW);
Chin-An Tseng, Taipei (TW);
Hsiao-Wei Cheng, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 310 days.

(21) Appl. No.: 13/369,310

(22) Filed: Feb. 9, 2012

(65) Prior Publication Data
US 2013/0127698 A1    May 23, 2013

(30) Foreign Application Priority Data
Nov. 23, 2011 (TW) .............................. 100142918 A

(51) Int. Cl.
*G02F 1/1343* (2006.01)
*G09G 3/34* (2006.01)
*G02F 1/1337* (2006.01)

(52) U.S. Cl.
CPC .... *G02F 1/134309* (2013.01); *G02F 1/133753* (2013.01); *G02F 2001/134318* (2013.01); *G02F 2001/134372* (2013.01)

(58) Field of Classification Search
CPC .............. G02F 2001/134372; G02F 1/134309; G02F 2001/134318; G02F 1/133753; G09G 2300/0443; G09G 2300/0439
USPC .......................................................... 345/90
See application file for complete search history.

(56) References Cited

U.S. PATENT DOCUMENTS

| 6,081,309 | A | 6/2000 | Suzuki et al. |
| 7,773,182 | B2 | 8/2010 | Kimura et al. |
| 7,880,848 | B2 | 2/2011 | Kimura et al. |
| 8,164,729 | B2 | 4/2012 | Kimura et al. |
| 8,619,227 | B2 | 12/2013 | Kimura et al. |
| 2004/0263748 | A1 | 12/2004 | Park et al. |
| 2007/0126969 | A1 | 6/2007 | Kimura et al. |
| 2007/0225096 | A1 | 9/2007 | Fujita |
| 2008/0231790 | A1* | 9/2008 | Jang .............................. 349/143 |

(Continued)

FOREIGN PATENT DOCUMENTS

| CN | 1979275 | 6/2007 |
| JP | H11-149070 | 6/1999 |

OTHER PUBLICATIONS

"First Office Action of China Counterpart Application", issued on Dec. 3, 2013, p. 1-p. 6.
"Office Action of Taiwan Counterpart Application", issued on Jun. 23, 2014, p. 1-p. 7.

*Primary Examiner* — Lun-Yi Lao
*Assistant Examiner* — Ibrahim Khan
(74) *Attorney, Agent, or Firm* — Jianq Chyun IP Office

(57) ABSTRACT

A display panel includes a first substrate, scan lines, data lines, pixel units, a second substrate, a display medium, and a color filter layer. The scan lines and the data lines are disposed on the first substrate. The pixel units are electrically connected to the scan lines and the data lines. Each pixel unit includes first, second, third, and fourth pixels. An extension direction of slit patterns of the first and second pixels is different from an extension direction of at least one of slit patterns of the third and fourth pixels. The color filter layer includes a first color filter pattern disposed corresponding to the first pixel, a second color filter pattern disposed corresponding to the second pixel, and a third color filter pattern disposed corresponding to the third pixel and the fourth pixel.

16 Claims, 5 Drawing Sheets

(56) References Cited

U.S. PATENT DOCUMENTS

| | | | |
|---|---|---|---|
| 2010/0123866 A1* | 5/2010 | Chang et al. | 349/141 |
| 2010/0207862 A1* | 8/2010 | Xu et al. | 345/90 |
| 2010/0208185 A1* | 8/2010 | Van Bommel et al. | 349/139 |
| 2010/0225252 A1* | 9/2010 | Weaver et al. | 315/312 |
| 2010/0296041 A1 | 11/2010 | Kimura et al. | |
| 2011/0134353 A1 | 6/2011 | Kimura et al. | |
| 2012/0194758 A1* | 8/2012 | Kimura et al. | 349/46 |
| 2014/0111727 A1 | 4/2014 | Kimura et al. | |

* cited by examiner

DISPLAY PANEL

CROSS-REFERENCE TO RELATED APPLICATION

This application claims the priority benefit of Taiwan application serial no. 100142918, filed on Nov. 23, 2011. The entirety of the above-mentioned patent application is hereby incorporated by reference herein and made a part of this specification.

BACKGROUND OF THE INVENTION

1. Field of the Invention

The invention relates to a display panel, and more particularly, to a fringe field switching (FFS) liquid crystal display (LCD) panel.

2. Description of Related Art

Recently, with continuing maturation of photoelectric technology and semiconductor fabrication, development of flat panel displays is booming. Among the flat panel displays, liquid crystal displays (LCDs) free of harmful radiation and characterized by low operating voltage, light weight, and small volume have gradually replaced conventional cathode ray tube (CRT) displays and have become mainstream display products. However, the LCDs are still subject to the limited viewing angles. At this current stage, displays capable of satisfying the requirement for wide viewing angle include a twisted nematic (TN) LCD equipped with a wide viewing film, an in-plane switching (IPS) LCD, a fringe field switching (FFS) LCD, a multi-domain vertical alignment (MVA) display, and so on.

The existing FFS LCD encounters the color shift issue. Specifically, red, blue, and green pixels at large viewing angles may be accompanied with color shift to different extent. To resolve said issue, the red, blue, and green pixels are designed to have two domains according to the related art. Nonetheless, disclination lines may be generated in the middle of the red, blue, and green pixels with two domains, thus deteriorating the display quality of the display.

SUMMARY OF THE INVENTION

The invention is directed to a display panel for resolving an issue arising in a conventional FFS LCD panel.

In the invention, a display panel including a first substrate, a plurality of scan lines, a plurality of data lines, a plurality of pixel units, a second substrate, a display medium, and a color filter layer is provided. The scan lines and the data lines are disposed on the first substrate. The pixel units are electrically connected to the scan lines and the data lines, and each of the pixel units includes a first pixel, a second pixel, a third pixel, and a fourth pixel. Each of the first pixel, the second pixel, the third pixel, and the fourth pixel includes an active device, a pixel electrode, and a common electrode. The pixel electrode is electrically connected to the active device, the common electrode is disposed corresponding to the pixel electrode, and one of the pixel electrode and the common electrode has at least one slit pattern. The slit pattern of the first pixel and the slit pattern of the second pixel have a first extension direction, at least one of the slit pattern of the third pixel and the slit pattern of the fourth pixel has a second extension direction, and the first extension direction is different from the second extension direction. The second substrate is located opposite to the first substrate. The display medium is located between the first substrate and the second substrate. The color filter layer includes a first color filter pattern disposed corresponding to the first pixel, a second color filter pattern disposed corresponding to the second pixel, and a third color filter pattern disposed corresponding to the third pixel and the fourth pixel.

Based on the above, the extension direction of the slit pattern of the first pixel and the slit pattern of the second pixel is different from the extension direction of at least one of the slit pattern of the third pixel and the slit pattern of the fourth pixel. In addition, the third color filter pattern of the color filter layer is disposed corresponding to the third pixel and the fourth pixel. Accordingly, said design may resolve the color shift issue arising in the display panel when an image on the display panel is viewed at large viewing angles. Since the pixel described herein is not equipped with two domains, the issue of disclination lines in the conventional pixel does not arise, and thus the display quality of the display is not deteriorated.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

FIG. 2 is taken along section lines I-I' and II-II' of the pixel array depicted in FIG. 1.

DESCRIPTION OF EMBODIMENTS

Figure 1:
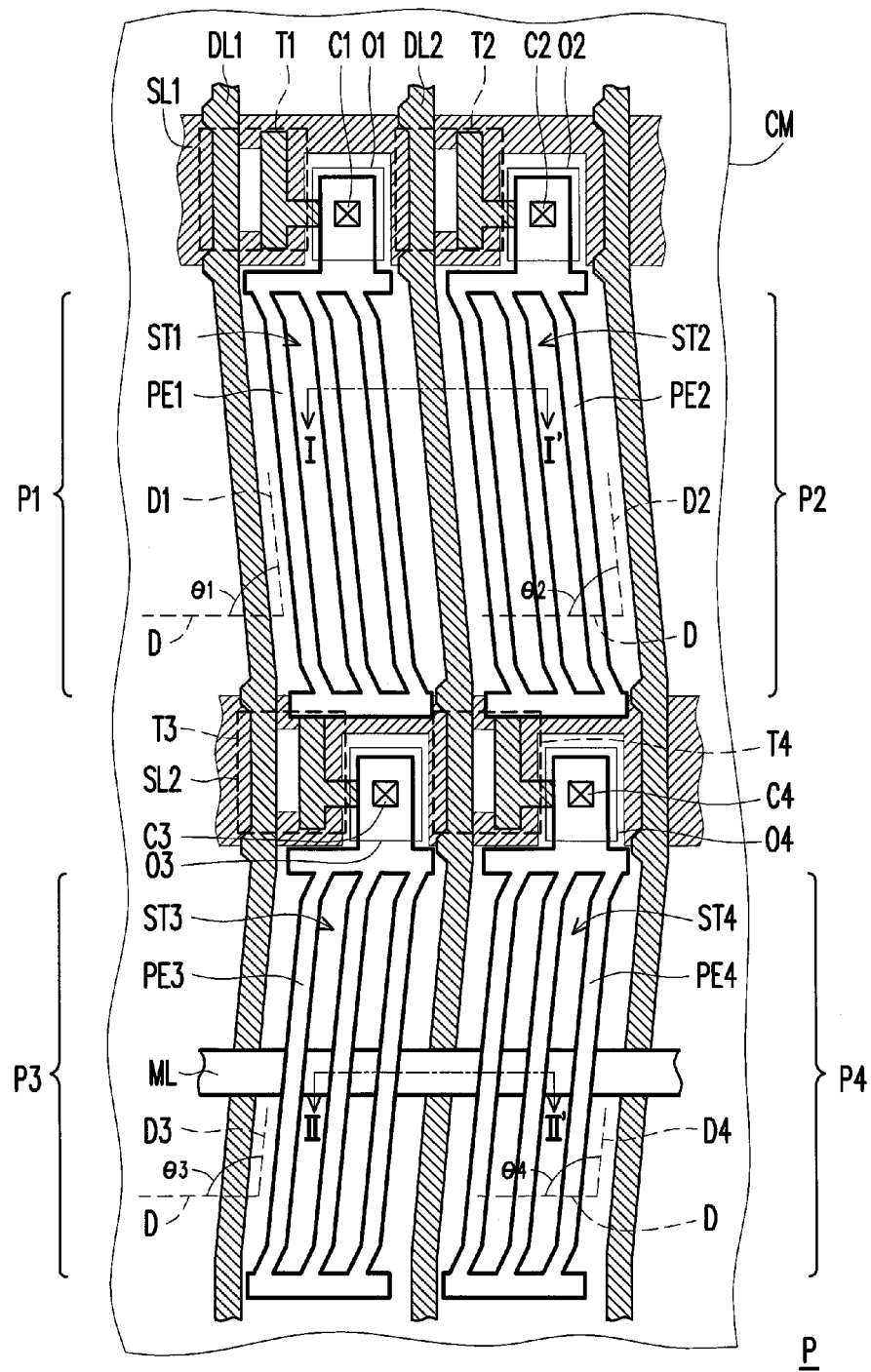
FIG. 1 is a schematic top view illustrating a pixel array of a display panel according to an embodiment of the invention.
Figure 2:
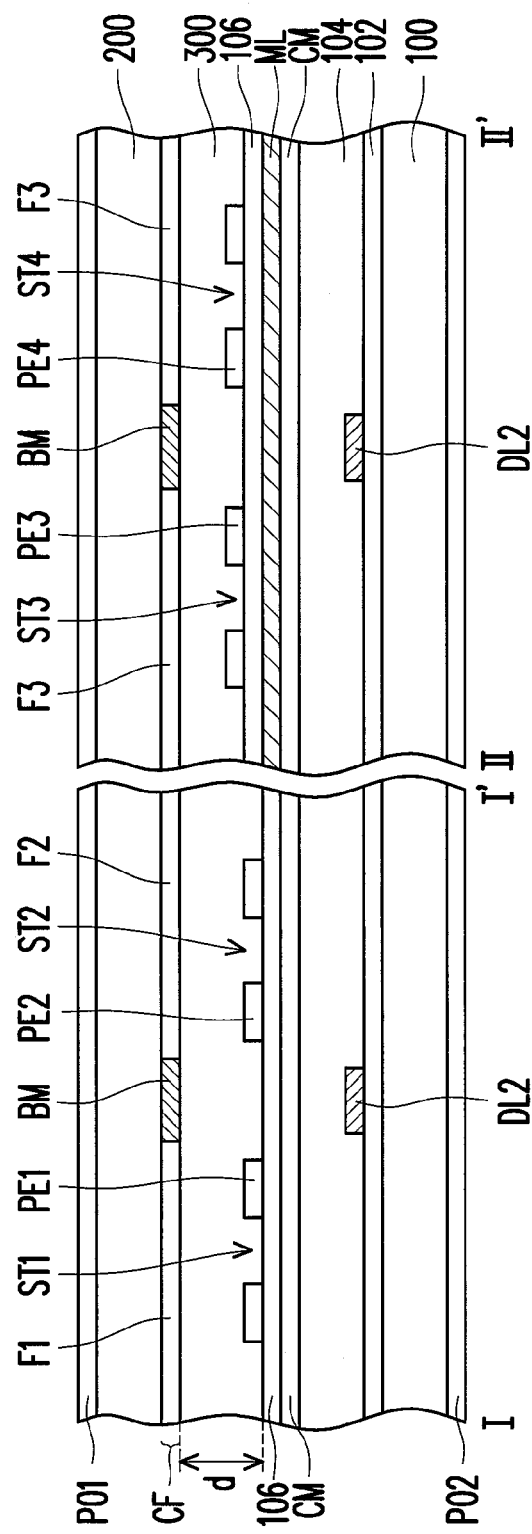
FIG. 2 is a schematic cross-sectional view illustrating a display panel according to an embodiment of the invention. Here.

FIG. 1 is a schematic top view illustrating a display panel according to an embodiment of the invention. FIG. 2 is a schematic cross-sectional view illustrating a display panel according to an embodiment of the invention. Here, FIG. 2 is taken along section lines I-I' and II-II' of the pixel array depicted in FIG. 1. With reference to FIG. 1 and FIG. 2, the display panel of the embodiment includes a first substrate 100, a plurality of scan lines SL1~SLn, a plurality of data lines DL1~DLm, a plurality of pixel units P, a second substrate 200, a display medium 300, and a color filter layer CF.

The first substrate 100 has a pixel array thereon. The scan lines SL1~SLn and the data lines DL1~DLm are disposed on the first substrate 100; in FIG. 1, only the scan lines SL1, SL2 and the data lines DL1, DL2 are exemplarily shown. The pixel units P are electrically connected to the scan lines SL1~SLn and the data lines DL1~DLm, and each of the pixel units P includes a first pixel P1, a second pixel P2, a third pixel P3, and a fourth pixel P4.

The scan lines SL1~SLn cross over the data lines DL1~DLm to define a plurality of pixel regions. An insulation layer 102 is sandwiched between the scan lines SL1~SLn and the data lines DL1~DLm. In consideration of electrical conductivity, the data lines DL1~DLm and the scan lines SL1~SLn are often made of metal materials. However, the invention is not limited thereto. According to other embodiments, the scan lines SL1~SLn and the data lines DL1~DLm may also be made of other conductive materials. For instance, the scan lines SL1~SLn and the data lines DL1~DLm may be made of an alloy, metal nitride, metal oxide, metal oxynitride, another appropriate material, or a layer in which a metal material and any other conductive material are stacked together.

As described above, the scan lines SL1~SLn and the data lines DL1~DLm define a plurality of unit regions arranged in columns and rows on the substrate 100. Particularly, the scan lines SL1~SLn are arranged in rows from top to bottom, while the data lines DL1~DLm are arranged in columns from left to right. The first, second, third, and fourth pixels P1~P4 are disposed in the unit regions that are arranged in columns and rows and defined by the scan lines SL1~SLn and the data lines DL1~DLm. In the present embodiment, the first pixel P1 and the second pixel P2 are arranged in one row, and the third pixel P3 and the fourth pixel P4 are arranged in another row. To be more specific, if the first pixel P1 and the second pixel P2 are arranged in the first row, the third pixel P3 and the fourth pixel P4 are arranged in the second row. It should be mentioned that the arrangement of the first, second, third, and fourth pixels P1~P4 is not limited herein. Namely, in other embodiments, the first, second, third, and fourth pixels P1~P4 may all be arranged in the same row.

Figure 4A:
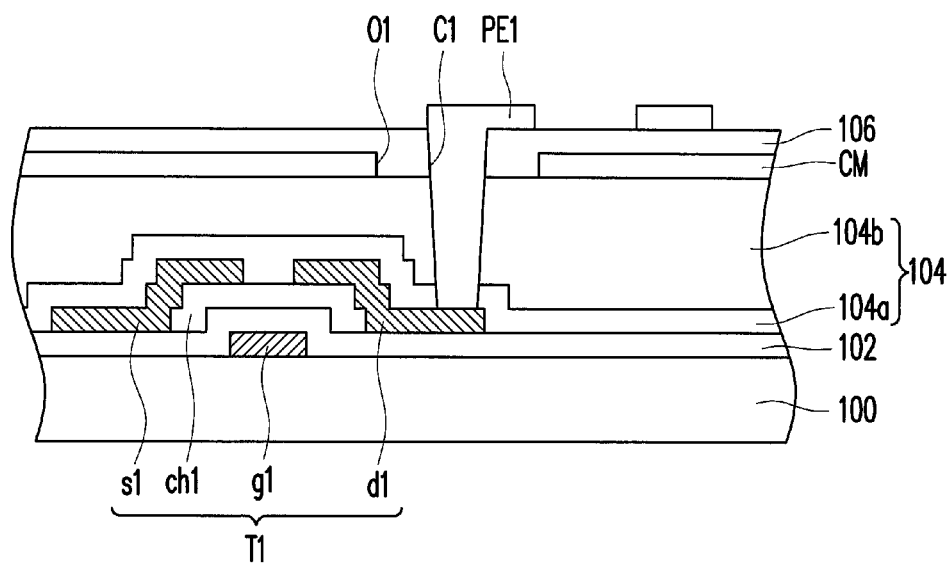
FIG. 4A is a schematic cross-sectional view illustrating a first pixel in a pixel unit according to an embodiment of the invention.

The first pixel P1 includes an active device T1, a pixel electrode PE1, and a common electrode CM. According to the present embodiment, the common electrode CM is disposed on an insulation layer 104, the pixel electrode PE1 is correspondingly disposed above the common electrode CM, and the pixel electrode PE1 and the common electrode CM are isolated from each other by an insulation layer 106. The pixel electrode PE1 is electrically connected to the active device T1. In particular, the pixel electrode PE1 is electrically connected to the active device T1 through a contact window C1 penetrating the insulation layers 104 and 106. As shown in FIG. 4A, the active device T1 includes a gate g1, a channel ch1, a source s1, and a drain d1, and the pixel electrode PE1 is electrically connected to the drain d1 through the contact window C1. Besides, the common electrode CM has an opening O1, such that the contact window C1 penetrating the insulation layers 104 and 106 is not in electrical contact with the common electrode CM. Here, the insulation layer 104 may include a passivation layer 104a and a planarization layer 104b; the passivation layer 104a is, for instance, made of an inorganic material, and the planarization layer 104b is, for instance, made of an organic material, which should not be construed as limitations to the invention.

According to the present embodiment, the common electrode CM is disposed below the pixel electrode PE1, and the common electrode CM and the pixel electrode PE1 are isolated from each other by the insulation layer 106. In addition, the pixel electrode PE1 has at least one slit pattern ST1 that extends toward a direction D1. Since the slit pattern ST1 of the pixel electrode PE1 has one single extension direction D1, the first pixel P1 has one domain. According to the present embodiment, the common electrode CM is disposed below the pixel electrode PE1, and the slit pattern ST1 is formed in the pixel electrode PE1, for instance; however, the invention is not limited thereto. According to another embodiment, the common electrode CM may also be disposed above the pixel electrode PE1, and the slit pattern ST1 may be formed in the common electrode CM.

The second pixel P2 includes an active device T2, a pixel electrode PE2, and a common electrode CM. According to the present embodiment, the common electrode CM is disposed on the insulation layer 104, the pixel electrode PE2 is correspondingly disposed above the common electrode CM, and the pixel electrode PE2 and the common electrode CM are isolated from each other by the insulation layer 106. The pixel electrode PE2 is electrically connected to the active device T2. Similarly, the active device T2 includes a gate, a channel, a source, and a drain (not shown), and the pixel electrode PE2 is electrically connected to the active device T2 through a contact window C2 penetrating the insulation layers 104 and 106. Here, the common electrode CM has an opening O2, such that the contact window C2 penetrating the insulation layers 104 and 106 is not in electrical contact with the common electrode CM.

As described above, in the present embodiment, the common electrode CM is disposed below the pixel electrode PE2, and the common electrode CM and the pixel electrode PE2 are isolated from each other by the insulation layer 106. In addition, the pixel electrode PE2 has at least one slit pattern ST2 that extends toward a direction D2. Since the slit pattern ST2 of the pixel electrode PE2 has one single extension direction D2, the second pixel P2 has one domain. According to the present embodiment, the common electrode CM is disposed below the pixel electrode PE2, and the slit pattern ST2 is formed in the pixel electrode PE2, for instance; however, the invention is not limited thereto. According to another embodiment, the common electrode CM may also be disposed above the pixel electrode PE2, and the slit pattern ST2 may be formed in the common electrode CM.

The third pixel P3 includes an active device T3, a pixel electrode PE3, and a common electrode CM. According to the present embodiment, the common electrode CM is disposed on the insulation layer 104, the pixel electrode PE3 is correspondingly disposed above the common electrode CM, and the pixel electrode PE3 and the common electrode CM are isolated from each other by the insulation layer 106. The pixel electrode PE3 is electrically connected to the active device T3. Similarly, the active device T3 includes a gate, a channel, a source, and a drain (not shown), and the pixel electrode PE3 is electrically connected to the active device T3 through a contact window C3 penetrating the insulation layers 104 and 106. Here, the common electrode CM has an opening O3, such that the contact window C3 penetrating the insulation layers 104 and 106 is not in electrical contact with the common electrode CM.

As described above, in the present embodiment, the common electrode CM is disposed below the pixel electrode PE3, and the common electrode CM and the pixel electrode PE3 are isolated from each other by the insulation layer 106. In addition, the pixel electrode PE3 has at least one slit pattern ST3 that extends toward a direction D3. Since the slit pattern ST3 of the pixel electrode PE3 has one single extension direction D3, the third pixel P3 has one domain. According to the present embodiment, the common electrode CM is disposed below the pixel electrode PE3, and the slit pattern ST3 is formed in the pixel electrode PE3, for instance; however, the invention is not limited thereto. According to another embodiment, the common electrode CM may also be disposed above the pixel electrode PE3, and the slit pattern ST3 may be formed in the common electrode CM.

The fourth pixel P4 includes an active device T4, a pixel electrode PE4, and a common electrode CM. According to the present embodiment, the common electrode CM is disposed on the insulation layer 104, the pixel electrode PE4 is correspondingly disposed above the common electrode CM, and the pixel electrode PE4 and the common electrode CM are isolated from each other by the insulation layer 106. The pixel electrode PE4 is electrically connected to the active device T4. Similarly, the active device T4 includes a gate, a channel, a source, and a drain (not shown), and the pixel electrode PE4 is electrically connected to the active device T4 through a contact window C4 penetrating the insulation layers 104 and 106. Here, the common electrode CM has an opening O4, such that the contact window C4 penetrating the insulation layers 104 and 106 is not in electrical contact with the common electrode CM.

As described above, in the present embodiment, the common electrode CM is disposed below the pixel electrode PE4, and the common electrode CM and the pixel electrode PE4 are isolated from each other by the insulation layer 106. In addition, the pixel electrode PE4 has at least one slit pattern ST4 that extends toward a direction D4. Since the slit pattern ST4 of the pixel electrode PE4 has one single extension direction D4, the fourth pixel P4 has one domain. According to the present embodiment, the common electrode CM is disposed below the pixel electrode PE4, and the slit pattern ST4 is formed in the pixel electrode PE4, for instance; however, the invention is not limited thereto. According to another embodiment, the common electrode CM may also be disposed above the pixel electrode PE4, and the slit pattern ST4 may be formed in the common electrode CM.

Figure 3:
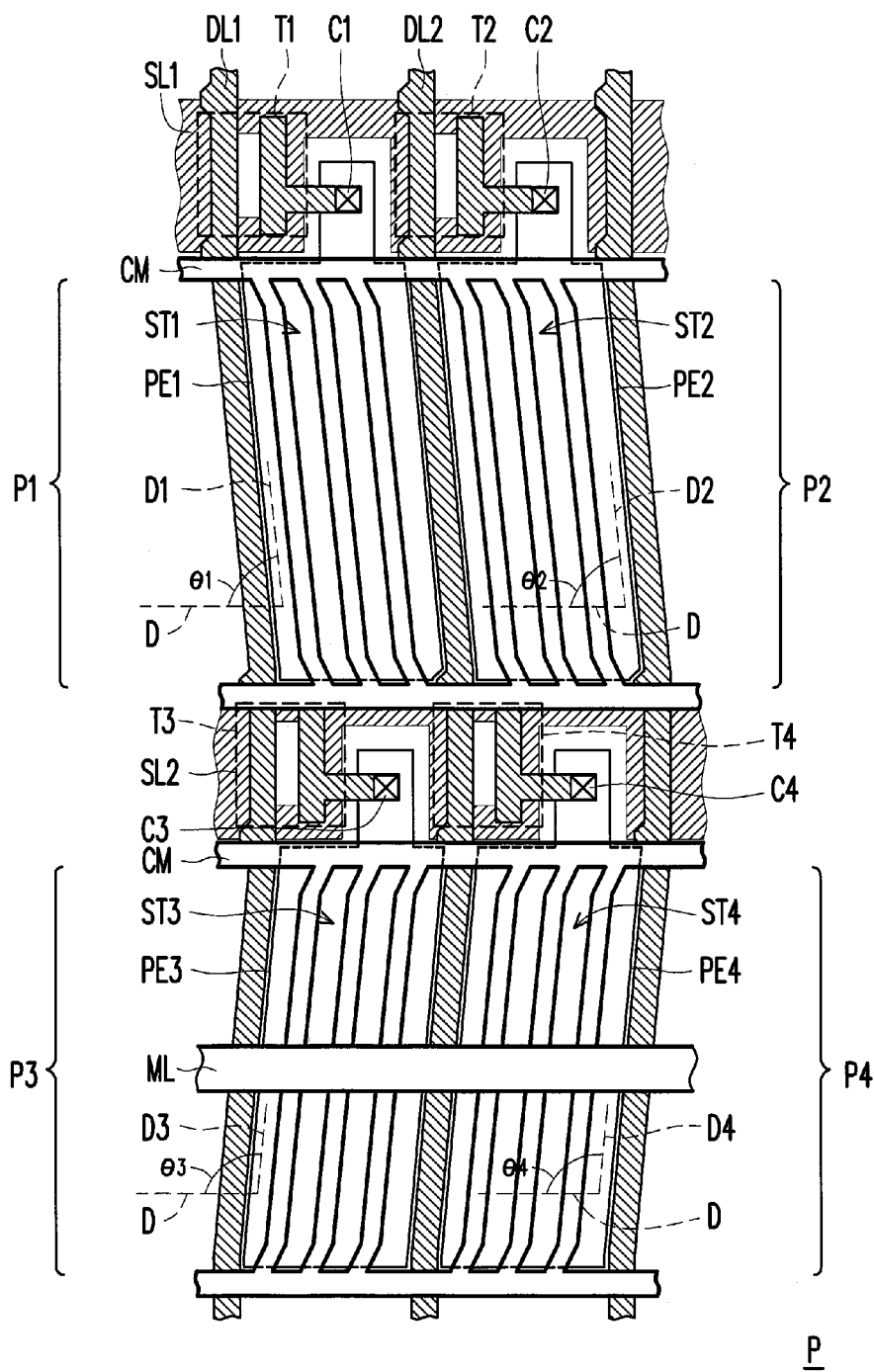
FIG. 3 is a schematic top view illustrating a pixel array of a display panel according to an embodiment of the invention.

In the present embodiment, the common electrode CM corresponding to each of the first, second, third, and fourth pixels P1~P4 is a non-patterned electrode film layer (do not have slit patterns) and is electrically connected to a common voltage Vcom. According to another embodiment, given that the slit patterns ST1~ST4 are formed in the common electrodes CM of the first, second, third, and fourth pixels P1~P4, the common electrodes CM of the first, second, third, and fourth pixels P1~P4 are patterned electrode film layers. Due to the pattern design of the electrode film layers, the common electrodes CM of the first, second, third, and fourth pixels P1~P4 can be electrically connected to the common voltage Vcom, as depicted in FIG. 3. With reference to FIG. 3, in the first, second, third, and fourth pixels P1~P4, the slit patterns ST1~ST4 are formed in the common electrodes CM of the first, second, third, and fourth pixels P1~P4, and the common electrodes CM are located above the pixel electrodes PE1~PE4. Besides, the pixel electrodes PE1~PE4 of the first, second, third, and fourth pixels P1~P4 do not have slit patterns but are lump or block patterns.

In the present embodiment, the extension direction D1 of the slit pattern ST1 of the first pixel P1 is the same as the extension direction D2 of the slit pattern ST2 of the second pixel P2, and the extension direction D3 of the slit pattern ST3 of the third pixel P3 is the same as the extension direction D4 and the slit pattern ST4 of the fourth pixel P4. Additionally, the extension direction D1/D2 is different from the extension direction D3/D4. However, the invention is not limited thereto. According to another embodiment of the invention, the extension direction D1 of the slit pattern ST1 of the first pixel P1 is the same as the extension direction D2 of the slit pattern ST2 of the second pixel P2, and the extension direction D1/D2 may be different from the extension direction D3/D4.

If the scan lines SL1~SL2 have an extension direction D in the present embodiment, an included angle θ1 is between the extension direction D1 and the extension direction D, an included angle θ2 is between the extension direction D2 and the extension direction D, an included angle θ3 is between the extension direction D3 and the extension direction D, and an included angle θ4 is between the extension direction D4 and the extension direction D. The included angle θ1 is substantially equal to the included angle θ2, the included angle θ3 is substantially equal to the included angle θ4, and the included angle θ1/θ2 is different from the included angle θ3/θ4. In the present embodiment, the included angle θ3/θ4 is supplementary to the included angle θ1/θ2, and one of the included angle θ1/θ2 and the included angle θ3/θ4 is less than 90 degrees and greater than 80 degrees. For instance, if the included angle θ1/θ2 is 85 degrees, the included angle θ3/θ4 is 95 degrees.

In order to allow the pixels P1~P4 to have the optical aperture ratio, the data lines DL1~DLm in the present embodiment extend along the extension direction D1/D2 and the extension direction D3/D4. That is to say, the data lines DL1~DLm of the present embodiment are not extended or arranged in form of straight line but arranged along the extension directions of the slit patterns ST1~ST4 of the pixels P1~P4, and thus the data lines DL1~DLm are extended or arranged in form of bending line. Note that the arrangement of the data lines DL1~DLm is not limited in the invention.

The display panel described herein not only has the pixel array located on the first substrate 100 but also includes the second substrate 200 and the display medium 300. With reference to FIG. 2, the second substrate 200 is located opposite to the first substrate 100. The display medium 300 is located between the first substrate 100 and the second substrate 200. The display medium 300 includes liquid crystal molecules, and a thickness of the display medium 300 may be greater than 3.2 μm. According to the present embodiment, the color filter layer CF is disposed on the second substrate 200, which should not be construed as a limitation to the invention.

The color filter layer CF includes a first color filter pattern F1 disposed corresponding to the first pixel P1, a second color filter pattern F2 disposed corresponding to the second pixel P2, a third color filter pattern F3 disposed corresponding to the third pixel P3 and the fourth pixel P4. Here, the first, second, and third color filter patterns F1, F2, and F3 are red, green, and blue filter patterns, respectively. Namely, the third color (blue) filter pattern F3 is correspondingly disposed above the third pixel P3 and the fourth pixel P4. Moreover, the color filter layer CF may further include a light shielding layer BM correspondingly disposed among the color filter patterns F1~F3.

Namely, in the present embodiment, the extension direction D1 of the slit pattern ST1 of the pixel electrode PE1 in the first pixel P1 corresponding to the first color (red) filter pattern F1 is the same as the extension direction D2 of the slit pattern ST2 of the pixel electrode PE2 in the second pixel P2 corresponding to the second color (green) filter pattern F2; the extension direction D3 of the slit pattern ST3 of the pixel electrode PE3 in the third pixel P3 corresponding to the third color (blue) filter pattern F3 is the same as the extension direction D4 of the slit pattern ST4 of the pixel electrode PE4 in the fourth pixel P4. Additionally, the extension direction D1/D2 is different from the extension direction D3/D4.

Figure 4B:
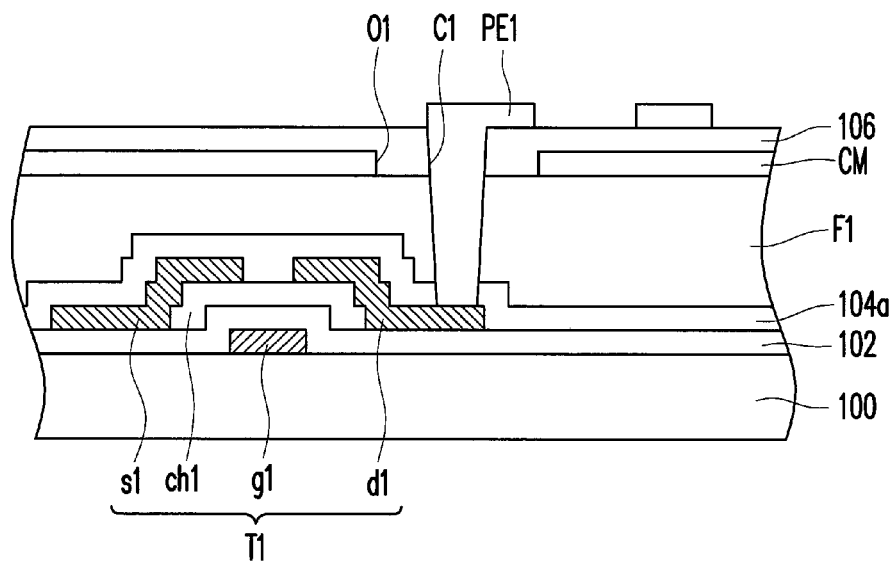
FIG. 4B is a schematic cross-sectional view illustrating a first pixel in a pixel unit according to another embodiment of the invention.

In another embodiment, the color filter layer CF may be disposed on the first substrate 100, as illustrated in FIG. 4B. When the color filter layer CF is disposed on the first substrate 100, the color filter pattern (e.g., the first color filter pattern F1) of the color filter layer CF is disposed above the insulation layer (the passivation layer) 104a, and the pixel electrodes PE1~PE4 and the common electrode CM are disposed above the color filter pattern (e.g., the first color filter pattern F1) of the color filter layer CF. Namely, the color filter layer CF herein may be disposed on the first substrate 100 or the second substrate 200.

From another perspective, the display panel described in the present embodiment may further include polarizers PO1 and PO2. The polarizer PO1 is located on a surface of the first substrate 100, and the polarizer PO2 is located on a surface of the second substrate 200. The polarization direction of the polarizer PO1 (or PO2) is parallel to or perpendicular to the extension direction of the scan lines SL1~SLn. If the polarization direction of the polarizer PO1 (or PO2) is parallel to the extension direction of the scan lines SL1~SLn, an included angle θ is between the polarization direction of the polarizer PO1 (or PO2) and the extension direction D1/D2 of the slit pattern ST1/ST2 of the first/second pixel P1/P2; an included angle θ' is between the polarization direction of the polarizer PO1 (or PO2) and the extension direction D3/D4 of the slit pattern ST3/ST4 of the third/fourth pixel P3/P4. Here, the included angle θ is complementary to the included angle θ', and one of the included angles θ and θ' is not equal to 90 degrees and is greater than 80 degrees. For instance, if the included angle θ is 85 degrees, the included angle θ' is 95 degrees.

Based on the above, in the present embodiment, the extension direction D1 of the slit pattern ST1 of the pixel electrode PE1 in the first pixel P1 corresponding to the first color (red) filter pattern F1 is the same as the extension direction D2 of the slit pattern ST2 of the pixel electrode PE2 in the second pixel P2 corresponding to the second color (green) filter pattern F2; the extension direction D3 of the slit pattern ST3 of the pixel electrode PE3 in the third pixel P3 corresponding to the third color (blue) filter pattern F3 is the same as the extension direction D4 of the slit pattern ST4 of the pixel electrode PE4 in the fourth pixel P4. Additionally, the extension direction D1/D2 is different from the extension direction D3/D4. Since each of the first, second, third, and fourth pixels P1~P4 has one domain, respectively, the issue of disclination lines in the conventional pixel does not arise herein, and thus the display quality of the display is not deteriorated.

Figure 5:
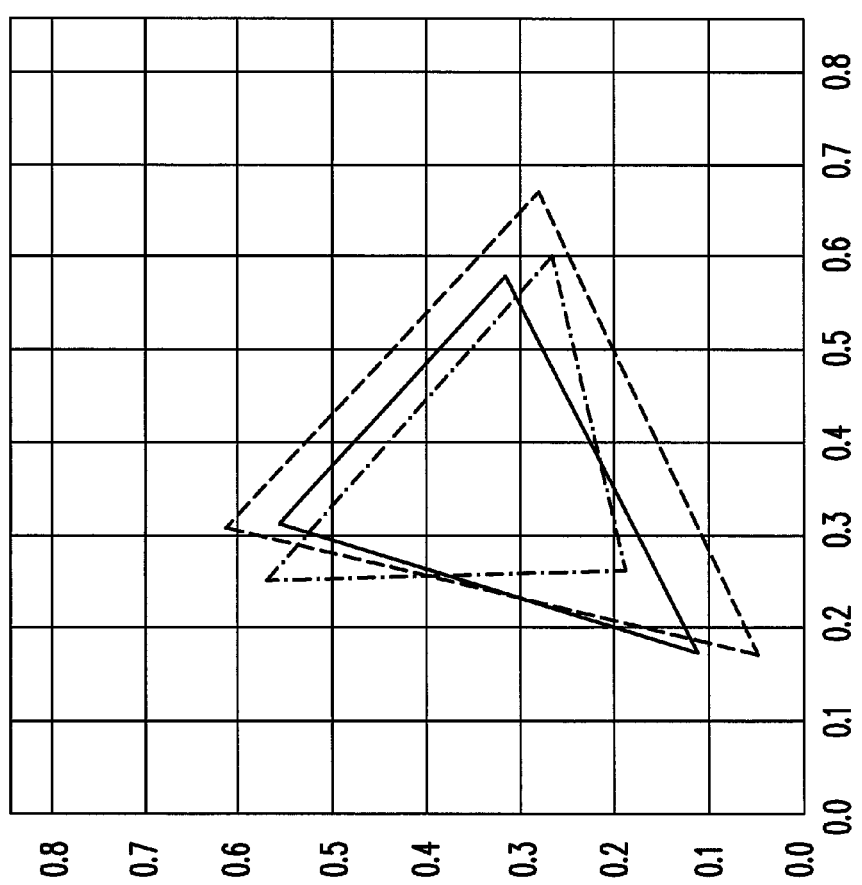
FIG. 5 is a schematic view illustrating a chromatic coordinate diagram of a display panel according to an embodiment of the invention.

Besides, due to the design of the extension directions of the slit patterns ST1~ST4 in the first, second, third, and fourth pixels P1~P4 described herein, the chromatic coordinates of pixels at large viewing angles can be adjusted, and the chromatic coordinate of the white light can be further controlled. Specifically, the primary-color chromatic coordinate is adjusted through disposing the third color (blue) filter pattern above the third pixel P3 and the fourth pixel P4, so as to reduce color shift, as indicated in FIG. 5. To be more specific, when a user watches the display panel at a wide viewing angle, the chromatic coordinates (shown by solid lines—chromatic coordinate and dotted lines—chromatic coordinate) of the first and second pixels P1 and P2 (red and green) shift in the same direction. Since the extension direction of the slit patterns of the first and second pixels P1 and P2 (red and green) is different from the extension direction of the slit patterns of the third and fourth pixels P3 and P4 (blue), the chromatic coordinates (shown by dotted lines—chromatic coordinate) of the third and fourth pixels P3 and P4 (blue) shift in a reverse direction. Thereby, color shift can be reduced.

In addition, the pixel array described in the present embodiment further includes a metal line ML disposed corresponding to the third pixel P3 and the fourth pixel P4. Besides, the metal line ML is electrically connected to the common electrodes of the third pixel P3 and the fourth pixel P4. For instance, in the present embodiment, the metal line ML is in direct contact with the common electrodes CM of the third pixel P3 and the fourth pixel P4, which should not be construed as a limitation to the invention. Owing to the metal line ML, the overall resistance of the common electrodes CM may be reduced. In addition, the common electrode CM of each pixel in the pixel array is electrically connected to one another; therefore, although the metal line ML is in contact with the common electrodes CM of the third pixel P3 and the fourth pixel P4, the design of the metal line ML leads to the reduction of the overall resistance of the common electrodes CM.

Note that the third color filter pattern F3 (blue) is correspondingly disposed above the third pixel P3 and the fourth pixel P4; accordingly, in the present embodiment, the metal line ML disposed on the third pixel P3 and the fourth pixel P4 does not pose a significant impact on the overall brightness or chromaticity of the pixel unit P.

From another perspective, the thickness of the display medium 300 in the display panel is greater than 3.2 μm according to the present embodiment. In general, when the thickness of the display medium 300 is greater than 3.2 μm, display images may become yellowish. Nonetheless, with the special design of the pixel array and the color filter layer in the display panel as described in the present embodiment, the display images will not become yellowish even though the thickness of the display medium 300 is greater than 3.2 μm. Moreover, because the thickness of the display medium 300 may be greater than 3.2 μm, the transmittance of the display panel can be enhanced.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A display panel comprising:
   a first substrate;
   a plurality of scan lines and a plurality of data lines, disposed on the first substrate;
   a plurality of pixel units electrically connected to the scan lines and the data lines, the pixel units are repeatedly arranged to form a pixel array on the first substrate, each of the pixel units comprising a first pixel, a second pixel, a third pixel and a fourth pixel adjacent to one another, the first pixel and the second pixels are located in a first row, the third pixel and the fourth pixels are located in a second row following the first row, and the first pixel, the second pixel, the third pixel and the fourth pixel respectively comprising:
   an active device;
   a pixel electrode electrically connected to the active device; and
   a common electrode disposed corresponding to the pixel electrode, one of the pixel electrode and the common electrode having at least one slit pattern,
   wherein the slit pattern of the first pixel and the slit pattern of the second pixel have a first extension direction, at least one of the slit pattern of the third pixel and the slit pattern of the fourth pixel has a second extension direction, and the first extension direction is different from the second extension direction;
   a second substrate located opposite to the first substrate;
   a display medium located between the first substrate and the second substrate; and
   a color filter layer comprising a first color filter pattern disposed corresponding to the first pixel, a second color filter pattern disposed corresponding to the second pixel, and a third color filter pattern disposed corresponding to the third pixel and the fourth pixel, wherein the first color filter pattern, the second color filter pattern, and the third color filter pattern have different colors.

2. The display panel as recited in claim 1, wherein the color filter layer is located on the second substrate.

3. The display panel as recited in claim 1, wherein the color filter layer is located on the first substrate.

4. The display panel as recited in claim 1, wherein the color filter layer covers the active devices of the first pixel, the second pixel, the third pixel and the fourth pixel, and the pixel electrodes or the common electrodes of the first pixel, the second pixel, the third pixel and the fourth pixel are disposed above the color filter layer.

5. The display panel as recited in claim 1, wherein the first color filter pattern, the second color filter pattern, and the third color filter pattern are respectively a red filter pattern, a green filter pattern, and a blue filter pattern.

6. The display panel as recited in claim 1, wherein the slit pattern of the third pixel and the slit pattern of the fourth pixel both have the second extension direction.

7. The display panel as recited in claim 1, wherein an included angle between an extension direction of the scan lines and the first extension direction is supplementary to an included angle between the extension direction of the scan lines and the second extension direction.

8. The display panel as recited in claim 7, wherein the included angle between the extension direction of the scan lines and the first extension direction or the included angle between the extension direction of the scan lines and the second extension direction is greater than 80 degrees and less than 90 degrees.

9. The display panel as recited in claim 1, further comprising a metal line disposed on the first substrate, the metal line being disposed corresponding to the third pixel and the fourth pixel and being electrically connected the common electrodes of the third pixel and the fourth pixel.

10. The display panel as recited in claim 1, wherein the pixel units are arranged in a plurality of columns and a plurality of rows, the first pixel and the second pixel of each of the pixel units are arranged in one of the rows, and the third pixel and the fourth pixel of each of the pixel units are arranged in another one of the rows.

11. The display panel as recited in claim 10, wherein the third pixel and the fourth pixel are arranged in the another one of the rows following the one of the rows where the first pixel and the second pixel are arranged.

12. The display panel as recited in claim 1, wherein the data lines are disposed along the first extension direction and the second extension direction.

13. The display panel as recited in claim 1, further comprising at least one polarizer located on at least one of the first substrate and the second substrate, a polarization direction of the polarizer being parallel to or perpendicular to an extension direction of the scan lines.

14. The display panel as recited in claim 1, wherein a thickness of the display medium is greater than 3.2 μm.

15. A display panel comprising:
a first substrate;
a plurality of scan lines and a plurality of data lines, disposed on the first substrate;
a first pixel unit, a second pixel unit, a third pixel unit and a fourth pixel unit electrically connected to the scan lines and the data lines, the first pixel unit, the second pixel unit, the third pixel unit, and the fourth pixel unit are arranged in a two by two formation, each of the first, second, and third pixel units comprising a first pixel, a second pixel, a third pixel and a fourth pixel adjacent to one another, the first pixel and the second pixels are located in a first row, the third pixel and the fourth pixel are located in a second row following the first row, and the first pixel, the second pixel, the third pixel and the fourth pixel respectively comprising:
an active device;
a pixel electrode electrically connected to the active device; and
a common electrode disposed corresponding to the pixel electrode, one of the pixel electrode and the common electrode having at least one slit pattern,
wherein the slit pattern of the first pixel and the slit pattern of the second pixel have a first extension direction, at least one of the slit pattern of the third pixel and the slit pattern of the fourth pixel has a second extension direction, and the first extension direction is different from the second extension direction;
a second substrate located opposite to the first substrate;
a display medium located between the first substrate and the second substrate; and
a color filter layer comprising a first color filter pattern disposed corresponding to the first pixel, a second color filter pattern disposed corresponding to the second pixel, and a third color filter pattern disposed corresponding to the third pixel and the fourth pixel, wherein the first color filter pattern, the second color filter pattern, and the third color filter pattern have different colors.

16. A display panel comprising:
a first substrate;
a first scan line, a second scan line, a third scan line, and a fourth scan line sequentially disposed on the first substrate;
a first data line and a second data line disposed on the first substrate;
a first pixel, electrically connected to the first scan line and the first data line;
a second pixel, electrically connected to the first scan line and the second data line;
a third pixel, electrically connected to the second scan line and the first data line;
a fourth pixel, electrically connected to the second scan line and the second data line;
a fifth pixel, electrically connected to the third scan line and the first data line
a sixth pixel, electrically connected to the third scan line and the second data line;
a seventh pixel, electrically connected to the fourth scan line and the first data line;
an eighth pixel, electrically connected to the fourth scan line and the second data line,
wherein each of the pixels respectively comprising:
an active device;
a pixel electrode electrically connected to the active device; and
a common electrode disposed corresponding to the pixel electrode, one of the pixel electrode and the common electrode having at least one slit pattern,
wherein the slit pattern of the first pixel, the slit pattern of the second pixel, the slit pattern of the fifth pixel, and the slit pattern of the sixth pixel have a first extension direction, at least one of the slit pattern of the third pixel and the slit pattern of the fourth pixel and at least one of the slit pattern of the seventh pixel and the slit pattern of the eighth pixel have a second extension direction, and the first extension direction is different from the second extension direction;
a second substrate located opposite to the first substrate;
a display medium located between the first substrate and the second substrate; and
a color filter layer comprising a first color filter pattern disposed corresponding to the first pixel and the fifth pixel, a second color filter pattern disposed corresponding to the second pixel and the sixth pixel, and a third color filter pattern disposed corresponding to the third pixel, the fourth pixel, the seventh pixel, and the eighth pixel, wherein the first color filter pattern, the second color filter pattern, and the third color filter pattern have different colors.

* * * * *